Feb. 15, 1944.  H. MASTERSON  2,341,876
HOIST LINE IMPLEMENT
Filed May 22, 1943  2 Sheets-Sheet 1

Inventor
Harry Masterson

By Clarence A. O'Brien
and Harvey B. Jacobson
Attorneys

Feb. 15, 1944. H. MASTERSON 2,341,876
HOIST LINE IMPLEMENT
Filed May 22, 1943 2 Sheets-Sheet 2

Inventor
Harry Masterson

By Clarence A. O'Brien
and Harvey B. Jacobson
Attorneys

Patented Feb. 15, 1944

2,341,876

UNITED STATES PATENT OFFICE 2,341,876

HOIST LINE IMPLEMENT

Harry Masterson, Cle Elum, Wash.

Application May 22, 1943, Serial No. 488,084

1 Claim. (Cl. 294—83)

The present invention appertains to new and useful improvements in hoist line implements, and more particularly to a device for lifting and piling baled hay and like materials.

The principal object of the present invention is to provide a releasable hook of marked simplicity, which can be manufactured and retailed at a low price, and which can be easily repaired in the event any of the few parts become worn or defective.

Another important object of the invention is to provide a device of the character stated which is positive acting and not liable to easily become out of order.

Other objects and advantages of the invention will become apparent to the reader of the following description.

Figure 1:
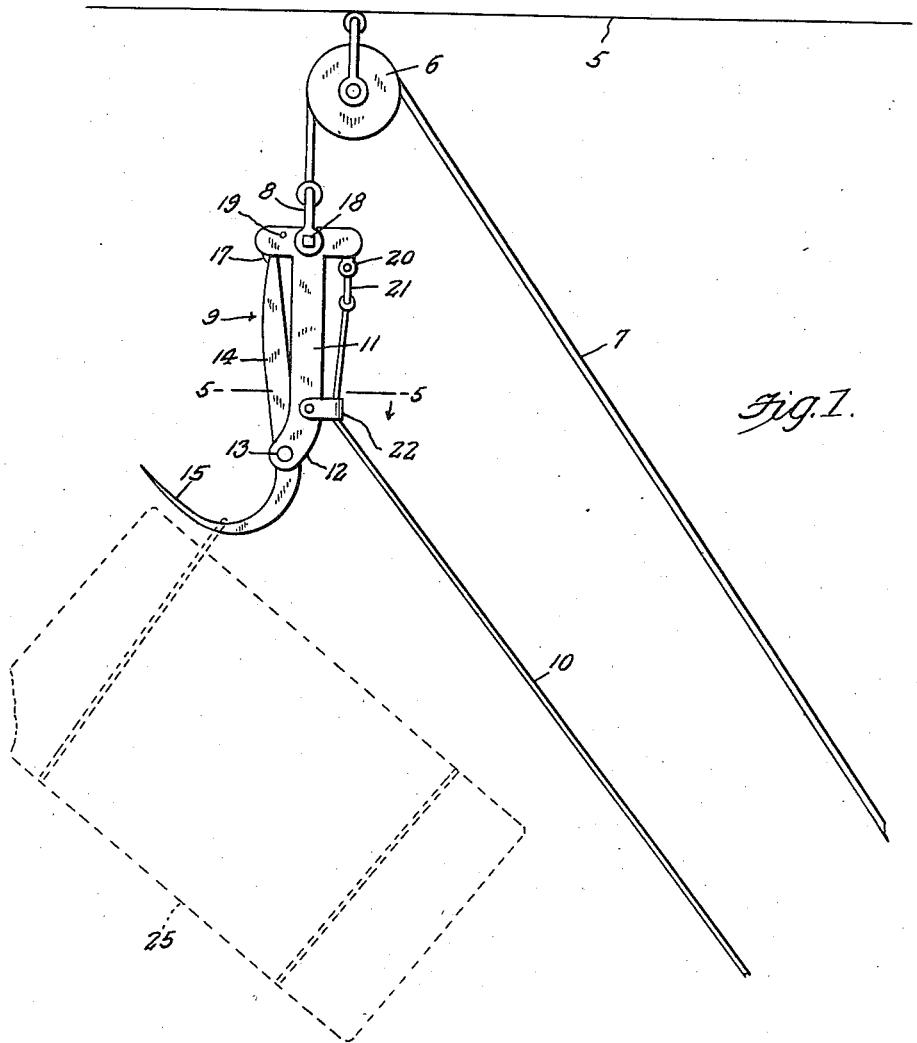
Figure 1 represents a side elevational view of the releasable hook associated with an acceptable rigging.
Figure 5:
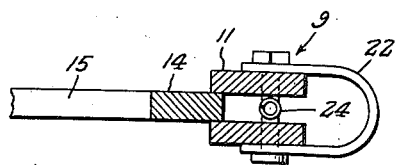
Figure 5 is a section on the line 5—5 of Figure 1.
Figure 2:
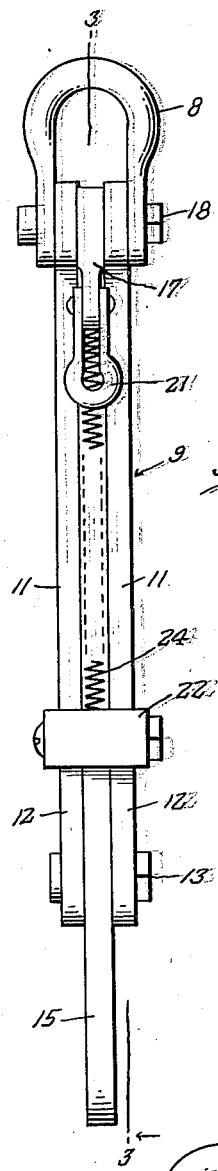
Figure 2 is a rear elevational view of the releasable hook.
Figure 3:
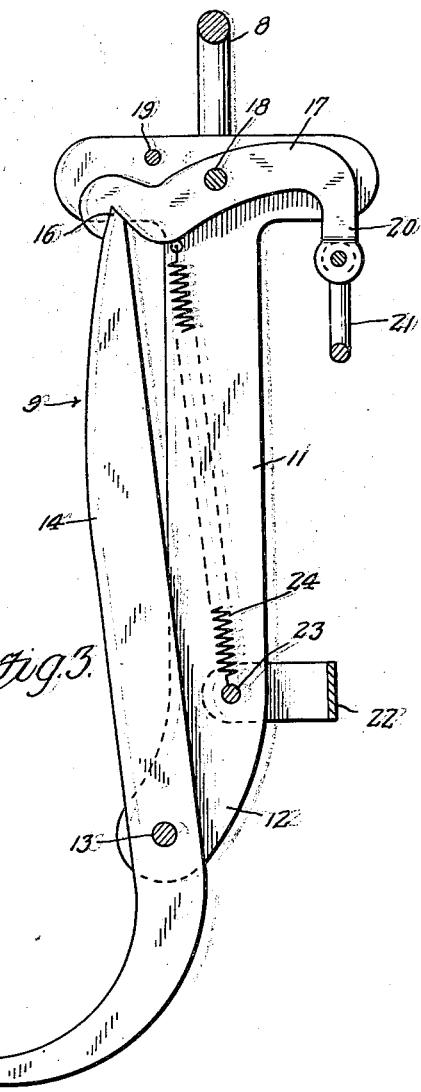
Figure 3 is a vertical sectional view taken on the line 3—3 of Figure 2.
Figure 4:
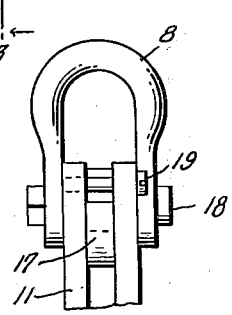
Figure 4 is a fragmentary front elevational view showing the upper portion of the releasable hook.

Referring to the drawings wherein like numerals designate like parts, it can be seen that numeral 5 denotes the supporting beam or element in a barn or elsewhere for supporting a pulley 6 over which a hoist line 7 is trained, this line passing over the pulley 6 to attach to a clevis 8 at the upper portion of the releasable hook which is generally referred to by numeral 9.

Numeral 10 denotes a trip line which extends to the trip mechanism of the hook 9.

Specifically, the hook structure involves a pair of T-shaped side members 11, 11, the lower portions of which are curved slightly in a forward direction as at 12 and through these end portions a pin 13 is disposed, this pin passing through the lower portion of the shank 14 of a sharp hook 15. The upper end portion of the shank 14 is beveled as at 16 and seats in a notch at one end of a rocker 17 which rocks on a pin 18 disposed through the upper end portions of the T-shaped members 11. A suitable spacer element 19 is disposed through the upper end portions of the members 11, and this also serves as a stop for the underlying end portion of the rocker 17.

The remaining end of the rocker 17 has a depending portion 20 to which an eye 21 is pivotally connected, and to this eye is attached the trip line 10, this line extending through a guide loop 22 springably connected to the lower portions of the side members 11. A pin 23 is disposed through the side members 11 for holding the guide loop 22 in place, and interposed between this pin 23 and an anchoring element on the rocker 17 is a tension spring 24 which normally serves to hold the notched end of the rocker 17 engaged with the beveled end 16 of the shank 14.

It can now be seen that baled hay 25, or other material, can be lifted by the hook 15 and when elevated to the desired position, can be released by a pull on the line 10.

While the foregoing specification sets forth the invention in specific terms, it is to be understood that numerous changes in the shape, size, and materials may be resorted to without departing from the spirit and scope of the invention as claimed hereinafter.

Having described the invention, what is claimed as new is:

A hook structure for suspension from a hoist line comprising a frame embodying a pair of side-by-side laterally spaced, T-shaped members having upper cross-heads and lower curved ends, a hook pivoted between said curved ends to depend from said pivot and provided with a shank upstanding from said pivot and terminating between said cross-heads in a beveled sharp end, a bar-like rocker pivoted intermediate its ends between said cross-heads in the center of the same to extend horizontally between the cross-heads and having an edge notch at one end straddling said beveled end of said shank and a downturned opposite end, a clevis depending from said downturned end of said rocker for the attachment of a pull line thereto, a stud extending between said side members below said rocker, a coil spring having one end connected to said rocker adjacent said notch and its other end connected to said stud, and a guide loop for said line pivoted on said stud and straddling said members.

HARRY MASTERSON.